United States Patent [19]

Dunham

[11] 4,023,815

[45] May 17, 1977

[54] COLLET CHUCK ASSEMBLY FOR CUSTOM APPLICATIONS

[75] Inventor: Russell H. Dunham, New Fairfield, Conn.

[73] Assignee: The Dunham Tool Company, Inc., New Fairfield, Conn.

[22] Filed: Jan. 12, 1976

[21] Appl. No.: 648,460

[52] U.S. Cl. .................... 279/46 R; 279/1 A; 279/51
[51] Int. Cl.² ........................................ B23B 31/20
[58] Field of Search ............... 279/41, 46, 51, 1 A, 279/43, 50

[56] References Cited

UNITED STATES PATENTS

| | | | |
|---|---|---|---|
| 1,125,780 | 1/1915 | Waite | 279/51 |
| 2,432,860 | 12/1947 | Clatfelter | 279/1 A |
| 2,994,539 | 8/1961 | Farnsworth | 279/51 |
| 3,411,796 | 11/1968 | Decker | 279/46 |
| 3,539,193 | 11/1970 | Parsons | 279/51 |

*Primary Examiner*—Gil Weidenfeld
*Attorney, Agent, or Firm*—Mandeville and Schweitzer

[57] ABSTRACT

A collet chuck assembly is provided for accommodating workpieces of unusual shape and non-standardized sizes, as well as standard sizes. The assembly includes an insert configured to be firmly received into and held by standard sized collets. The insert has circumferentially spaced longitudinally extending radial slots forming jaws arranged to coact with a conventional collet for receiving and holding a workpiece. Preferably, at least the forwardmost portion of the insert body is comprised of a soft metal which may be easily machined, after the insert is received in the collet, for accommodating unconventionally shaped and sized workpieces.

2 Claims, 3 Drawing Figures

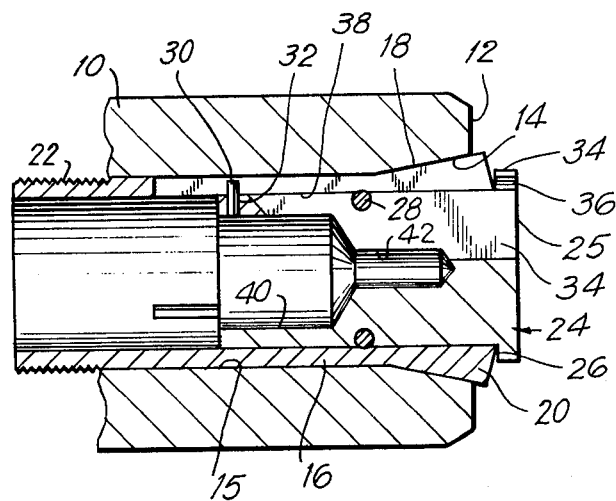
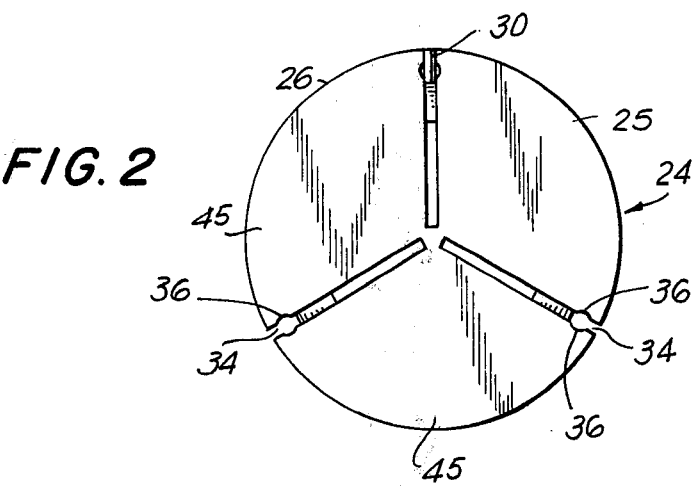
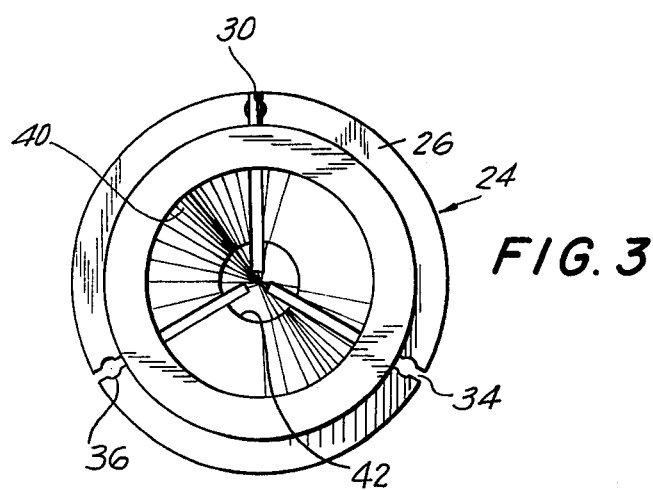

COLLET CHUCK ASSEMBLY FOR CUSTOM APPLICATIONS

STATEMENT OF THE INVENTION

This invention relates to collet chuck assemblies for accommodating unusally shaped or dimensioned workpieces or work for which a proper sized collet chuck assembly is not readily available. An insert is provided which is configurated to be placed into a conventional collet initially in place of a work-piece. Subsequent to insertion of the insert and its firm positioning in the collet, the insert is drilled and bored or machined to the size and shape for accommodating the particular workpiece involved. Subsequent to this "customized" machining the workpiece may then be inserted into the collet chuck assembly of the invention.

Preferably, the insert utilized will include a circumferential front flange for engaging the front surface of the collet into which it is inserted and includes a circumferentially positioned O-ring for frictional engagement with the internal bore of the collet. Also included with the assembly of the invention is a locating pin which cooperates with one of the spaced longitudinal slots of the collect to prevent relative rotation between the insert and the collet body. Preferably, the locating pin is positioned to align the longitudinal slots of the collet with the longitudinal slots of the insert.

THE BACKGROUND OF THE INVENTION

As will be understood, it is conventional in the use of a lathe to maintain a supply of or set of collet chucks of varying dimensions for use on the lathe spindle to accommodate different sized workpieces. As will be appreciated further, each individual collet chuck will accommodate workpieces of varying diameters within a specific range. Nevertheless, although a set of such collect chucks will accommodate a fairly wide range of diameters of workpieces, it is not unusual to come across a workpiece of a diameter or shape for which there is no collet on hand.

In the past, in order to accommodate these "emergency" situations, aside from delaying operations to the extent necessary to purchase a properly dimensioned collet chuck, the usual procedure is simply to utilize a "blank" or undrilled collet chuck which is then machined or "customized" by the operator so that it will receive the workpiece. Such blank or undrilled collets are expensive because they still must be properly prepared initially when they are produced to be received into the spindle including machining the threads and outer cam surfaces adjacent the front of the collet. This preparation is expensive when the collet is to handle perhaps, only a single unusually shaped or dimensioned workpiece, or several in one run of work. Moreover, the internal machining of the blank to receive the workpiece must then be carried out. Moreover, the changeover time is longer.

DESCRIPTION OF THE INVENTION

With this invention, by contrast, by utilizing the "emergency" insert of the invention, a customized accommodation of unusually shaped or dimensioned workpieces may be achieved rapidly and with little delay involved in machining to make the accommodation. That is, the outer surfaces of the insert of the invention are configured to be received into conventionally sized and dimensioned collets. Thus, the insert is placed in the collet and fixed therein in a manner which allows the insert to "take the place of" a workpiece. Subsequent to the firm affixing of the insert in the collet, an internal bore is drilled in the insert which bore is properly shaped and dimensioned to accommodate the workpiece involved.

The workpiece may then be inserted into the insert alreadly affixed in the collet for proper working of the workpiece in the spindle of the lathe. Preferably, the insert of the invention will be comprised of a comparatively soft metal such as unhardened steel, for example, accommodating the drilling and/or machining of a properly dimensioned bore therein with relative ease. Moreover, the insert is provided with a plurality of circumferentially spaced longitudinally extending grooves which cooperate with the collet itself in properly gripping the workpiece once the customized bore in the insert has been made. The insert of the invention includes a circumferentially extending groove for receiving a resilient ring which cooperates in frictional engagement with the bore of the collet for firmly fixing the insert in the bore of the collet.

In addition, the insert includes a radial bore with a locating pin which extends laterally from the insert body. The pin cooperates with one of the longitudinally extending slots in the collet for sliding engagement within that slot and for preventing relative rotation between the insert body and the collet. Preferably, the radial bore and pin are aligned with one of the longitudinal slots in the insert to align those slots with those of the collet. Also, the longitudinally extending circumferentially spaced radial slots of the insert body include conventional recesses for inserting pins therein to prevent compression of the insert body while it is being positioned and drilled in the collet. Thus, once the customized bore in the insert is drilled, the insert and the collet have a plurality of a cooperating circumferentially spaced gripping jaws on the outer ends thereof for gripping the workpiece inserted in the customized bore of the insert, under the action of a draw tube attached to the inner or rear end of the collet body.

With the foregoing objects in view, this invention will now be described in more detail, and other objects and advantages thereof will be apparent from the following description, the accompanying drawings, and the appended claims.

DESCRIPTION OF THE DRAWINGS

FIG. 1 is a cross sectional view showing a collet chuck assembly embodying the invention;

FIG. 2 is a front view of the collet chuck insert of the invention;

FIG. 3 is a rear view of the collet chuck insert of the invention.

DETAILED DESCRIPTION OF THE INVENTION

Referring to the drawings in which like references refer to like parts throughout the several views thereof, a spindle 10 is shown in FIG. 1 which is mounted on a lathe (not shown) in the usual manner. Spindle 10 has a front face 12 and a longitudinal bore 15 for receiving a collet 16 therein. Bore 15 has a conical outer portion 14 providing a cam surface for cooperation with a conical cam surface 18 on the outer surface of collect 16 adjacent the front end thereof. Collet 16 which may be a standard 5C collet, conventionally constructed in tubular form and has a plurality of circumferentially spaced radially extending longitudinal slots forming a plurality of fingers 20. Thus, when the collet 16 is drawn into the spindle 10, the camming surfaces 14, 18, cooperate to force the jaws 20 radially inward. The inner end of the collet 16, for this purpose, is externally threaded as at 22 for cooperation with a draw tube, not shown, of the machine tool or lathe.

While such a conventionally constructed and operable collet will accommodate a limited range of diameters of workpieces therein, and while a set of collets are usually provided which will all fit into the bore 15 of a spindle such as 10 in a conventional lathe, occasionally the dimension or shape of the workpiece involved will be such that none of the collets in the set available will accommodate the workpiece in properly affixed fashion for appropriate working thereon. Thus, in accordance with this invention, an "emergency" insert 24 is provided for insertion into the collet for cooperation with jaws 20 of the collet. The insert includes a circumferential groove 26 accommodating a resilient ring such as O-ring 28 which cooperates in frictional engagement with the internal bore 38 of collet 16.

Insert 24 includes radially extending bore 32 for receiving a locating pin 30 therein. Pin 30, when insert 24 is inserted into bore 38 of collet 16, slides along and is received into one of the longitudinally extending radial slots of the collet. Thus, pin 30 cooperates with the sides of the slot to prevent relative rotation between insert body 24 and collet 16. Preferably, insert 24 will have an outer circumferential flange 26 serving as a stop for insert 24, and cooperating with the front face of collet jaws 20 during insertion of insert 24 into bore 38 of collet 16.

As shown in FIGS. 1, 2 and 3, insert 24 has a plurality of circumferentially spaced longitudinally extending radial slots 34. While three such slots 34 are shown circumferentially spaced 120° apart, it will be appreciated by practitioners in the art that a larger number of such grooves may be equally spaced around insert body 24 depending upon the dimensions of the spindle and the workpieces involved. The opposed walls of each slot 34 have cooperating recesses 36 for receiving, temporarily spacer pins therein during the drilling of the customized center bore in the insert of the invention. Insert 24 has an internal bore 40 and a counter bore 42 for imparting a degree of resiliency to the outer walls of insert 24 to accommodate its insertion and proper fit into the bore 38 of collet 16.

Thus, when a workpiece must be worked on and is of a diameter or shape which cannot be properly accommodated by the collet chucks available, the insert 24 of the invention may be inserted into the bore 38 of a standard large diameter collet 16. As was stated above, during this insertion, pin 30 will cooperate with one of the longitudinally extending radial slots of the collet 16 in sliding engagement therewith. Moreover, once insert 24 is inserted, O-ring 28 frictionally engages bore 38 of the collet to help hold insert 24 in the collet. Insertion is completed when flange 26 engages the front faces of collet jaws 20.

Subsequent to this insertion, metallic pins are inserted temporarily in the opposed recesses 36 of each groove 34 of insert 24. Then, the draw tube (not shown) connected to the threaded portion 22 of collet 16 is drawn to the left, as shown in FIG. 1 causing the jaws 20 to grip insert body 24 firmly. Subsequent to this, a "customized" bore is machined into the insert 24 to accommodate in proper dimension the workpiece to be worked upon.

Subsequent to the customized drilling and machining of the bore for accommodating the workpiece involved, the metallic pins are removed from opposed recesses 36. The draw tube is then actuated to move collet 16 to the right to ease insertion of the workpiece into the drilled bore. The workpiece is then inserted into the "customized" bore machined into insert 24. Subsequent to this insertion, the draw tube can then be moved again to the left as shown in FIG. 1, causing a cooperating gripping engagement of a workpiece inserted therein, not only by the jaws 20 of collet 16, but also by the jaws 45 formed in the outer end of insert 24 by the customized formation of a bore therein.

As a further development in the use of the insert of the invention, once the "customized" bore has been prepared and the metallic pins have been removed, it has been found that pins comprised of a resilient material may be inserted into opposed recesses 36 to enhance the resiliency or "spring action" in the assembly jaws when required. The use of resilient pins are described in my copending application Ser. No. 661,845, filed Feb. 27, 1976.

In the use of such resilient pins, once the customized bore in the insert of the invention has been prepared and the usual metallic pins removed, a tapered tool may be inserted into the bore to force opposed recesses 36 apart slightly. Then, the pins may be simply dropped into the expanded recesses and the tapered tool removed. The jaws retract slightly upon removal, causing the opposed recesses to grip the resilient pins.

The resilient pins or plugs provide an enhanced spring action in the assembly of the invention, when required, more nearly characteristic of standard collet jaws comprised entirely of hardened steel, as compared to conventional emergency collets comprised of soft steel. That is, the soft steel does not always provide appropriate spring back characteristics and the jaws must be forced open to remove a workpiece clamped therein. It will be appreciated, therefore, that the resilient pins may be used with standard emergency collets, as well as with the insert assembly of the invention.

The pins may be comprised of any relatively hard resilient material such as, for example, Neoprene, a chloroprene rubber product of DuPont, or other natural or synthetic elastomer which provides sufficient resiliency. Generally, the pins will be of a diameter slightly larger than the bore formed by the opposed recesses. For example, generally the bores will have a diameter of 0.125 inches, while the pins for such a dimension will be about ½ inch long and have a diameter of about 0.126–0.127 inches.

Thus, as will be apparent from the foregoing, with very little machining, the insert of the invention may be utilized to provide a customized accommodation to workpieces of unusual dimensions or shape even though the collet chuck assemblies available with the lathe being used would not ordinarily accommodate such shapes or dimensions. This "emergency" accommodation is, moreover, accomplished without undue delay. In addition, as will be appreciated, by having a supply of such inserts of the invention on hand, an operator can take care of a wide variety of shapes and dimensions of workpieces without having to maintain a large and expensive inventory of differently dimensioned collet chucks.

While the methods and apparatus herein disclosed form preferred embodiments of this invention, this invention is not limited to those specific methods and apparatus, and changes can be made therein without departing from the scope of the invention which is defined in the appended claims. For example, a single collet may be produced with a complete set of the "customized" inserts of the invention for use with the collet, with the individual ones of the inserts being graded as to size of perhaps 1/32nd inch to accommodate a plurality of differently dimensioned workpieces. Such a set of inserts are pre-drilled, as will be appreciated, and are hardened at the factory for subsequent delivery.

I claim:

1. An insert for use with a collet chuck to customize the working dimensions thereof, said insert characterized by
   a. a body comprised of a machinable metal to be received into the bore of a collet;
   b. a plurality of circumferentially spaced longitudinally extending radial slots in said body;
   c. an integral circumferential flange adjacent the front face of said body for engaging the front face of a collet;
   d. a radially extending bore in said body adjacent the rear end thereof;
   e. a pin inserted in said bore and extending therefrom;
   f. a circumferential groove in said body; and
   g. a resilient member received in said circumferential groove.

2. The insert of claim 1, further characterized by
   a. at least one axial bore extending into the rear face of said insert.

* * * * *